US009315286B2

(12) United States Patent
Hanna

(10) Patent No.: US 9,315,286 B2
(45) Date of Patent: Apr. 19, 2016

(54) TEST TUBE LABELING ASSEMBLY

(71) Applicant: Milad A. Hanna, Staten Island, NY (US)

(72) Inventor: Milad A. Hanna, Staten Island, NY (US)

(*) Notice: Subject to any disclaimer, the term of this patent is extended or adjusted under 35 U.S.C. 154(b) by 217 days.

(21) Appl. No.: 14/284,576

(22) Filed: May 22, 2014

(65) Prior Publication Data

US 2015/0336702 A1 Nov. 26, 2015

(51) Int. Cl.

| | |
|---|---|
| ***B29C 65/78*** | (2006.01) |
| ***B29C 65/80*** | (2006.01) |
| ***B32B 37/26*** | (2006.01) |
| ***B32B 38/14*** | (2006.01) |
| ***B32B 41/00*** | (2006.01) |
| ***B65C 9/02*** | (2006.01) |
| ***B65C 9/04*** | (2006.01) |
| ***B65C 9/40*** | (2006.01) |
| ***B65C 9/42*** | (2006.01) |
| ***B65C 9/00*** | (2006.01) |
| ***B65C 9/18*** | (2006.01) |
| ***B65C 9/30*** | (2006.01) |
| ***B65C 3/12*** | (2006.01) |

(Continued)

(52) U.S. Cl.

CPC ... *B65C 9/42* (2013.01); *B01L 3/00* (2013.01); *B01L 3/5082* (2013.01); *B65C 3/10* (2013.01); *B65C 3/12* (2013.01); *B65C 9/00* (2013.01); *B65C 9/0015* (2013.01); *B65C 9/02* (2013.01); *B65C 9/18* (2013.01); *B65C 9/1865* (2013.01); *B65C 9/1869* (2013.01); *B65C 9/30* (2013.01); *B65C 9/46* (2013.01); *B01L 2200/14* (2013.01); *B01L 2300/021* (2013.01)

(58) Field of Classification Search

USPC ......... 156/350, 351, 378, 384, 387, 537, 538, 156/DIG. 5, DIG. 6, DIG. 8, DIG. 13, DIG. 46

See application file for complete search history.

(56) References Cited

U.S. PATENT DOCUMENTS 3,777,932 A * 12/1973 Matsui .................. B65G 65/42 221/204

5,097,938 A * 3/1992 Gruner ............ G01N 35/00029 198/397.04

(Continued)

FOREIGN PATENT DOCUMENTS

JP 07213586 A * 8/1995 ................ B65C 3/12

JP 08324527 A * 12/1996 ................ B65C 3/02

(Continued)

OTHER PUBLICATIONS

English Abstract of JP 07-213586 (Feb. 19, 2016).*

(Continued)

*Primary Examiner* — Sing P Chan

(57) ABSTRACT

A portable test tube labeling device provides labeling and tracking of test tubes used in patient care. The device includes a chute extending through a housing. A barrel extending across the chute is rotatable within the housing. Spacers are coupled to the barrel defining a plurality of channels extending along the barrel and receiving one of the test tubes as the barrel is rotated. A printing head and spool assembly are positioned in the housing. A tape is coupled to the spool assembly passing adjacent to the printing head wherein indicia is printable on labels on the tape. As the barrel is rotated, each label is extended from the tape and delivered onto the test tube in each channel. A collar is coupled to the barrel for retaining each of the test tubes in one of the channels between the collar and a base end of the barrel.

17 Claims, 5 Drawing Sheets

(51) Int. Cl.

| | |
|---|---|
| ***B01L 3/00*** | (2006.01) |
| ***B65C 3/10*** | (2006.01) |
| ***B65C 9/46*** | (2006.01) |

(56) References Cited

U.S. PATENT DOCUMENTS

| | | | | |
|---|---|---|---|---|
| 5,131,404 | A * | 7/1992 | Neeley | B01L 3/545 206/443 |
| 5,153,416 | A * | 10/1992 | Neeley | A61B 5/117 235/375 |
| 5,164,575 | A * | 11/1992 | Neeley | A61B 5/117 235/385 |
| 5,166,498 | A * | 11/1992 | Neeley | A61B 5/117 235/375 |
| 5,401,110 | A | 3/1995 | Neeley | |
| 5,663,545 | A | 9/1997 | Marquiss | |
| 5,688,361 | A | 11/1997 | Itoh | |
| 5,893,263 | A | 4/1999 | Matsumoto et al. | |
| D410,677 | S | 6/1999 | Matsumoto et al. | |
| 5,988,898 | A | 11/1999 | Ackley | |
| 6,808,574 | B1 | 10/2004 | Stevens et al. | |
| 7,383,965 | B2 * | 6/2008 | Matsumoto | G01N 35/04 209/518 |
| 8,322,510 | B2 * | 12/2012 | Pedrazzini | G01N 35/00732 198/346.2 |
| 8,630,016 | B2 * | 1/2014 | Swenson | B01L 3/5082 358/1.6 |
| 2004/0159589 | A1 * | 8/2004 | Matsumoto | G01N 35/04 209/546 |
| 2008/0292506 | A1 | 11/2008 | Itoh | |
| 2011/0145006 | A1 * | 6/2011 | Pedrazzini | G06F 19/366 705/2 |
| 2011/0173927 | A1 * | 7/2011 | Yamada | G01N 35/04 53/236 |
| 2012/0074162 | A1 * | 3/2012 | Takahashi | G01N 35/04 221/199 |
| 2012/0138231 | A1 * | 6/2012 | Matsumoto | B65C 3/12 156/360 |
| 2015/0197362 | A1 * | 7/2015 | Sato | G01N 35/04 156/363 |

FOREIGN PATENT DOCUMENTS

| | | | | |
|---|---|---|---|---|
| JP | 10077014 | A * | 3/1998 | B65C 3/02 |
| JP | 2008120404 | A * | 5/2008 | B65C 11/02 |

OTHER PUBLICATIONS

English Abstract of JP 2008-120404 (Feb. 19, 2016).*
English Abstract of JP 08324527 (Feb. 19, 2016).*
English Abstract of JP 10-077014 (Feb. 19, 2016).*

* cited by examiner

TEST TUBE LABELING ASSEMBLY

BACKGROUND OF THE DISCLOSURE

Field of the Disclosure

The disclosure relates to labeling devices and more particularly pertains to a new labeling device for providing a compact device for labeling and tracking test tubes used in patient care.

SUMMARY OF THE DISCLOSURE

An embodiment of the disclosure meets the needs presented above by generally comprising a housing and a chute extending through the housing. A barrel is rotatable within the housing and positioned to extend across the chute. Spacers are coupled to the barrel defining a plurality of channels extending along the barrel and receiving one of the test tubes as the barrel is rotated. A printing head and spool assembly are positioned in the housing. A tape is coupled to the spool assembly passing adjacent to the printing head wherein indicia is printable on labels on the tape. As the barrel is rotated, each label is extended from the tape and delivered onto the test tube in each channel. A collar is coupled to the barrel for retaining each of the test tubes in one of the channels between the collar and a base end of the barrel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
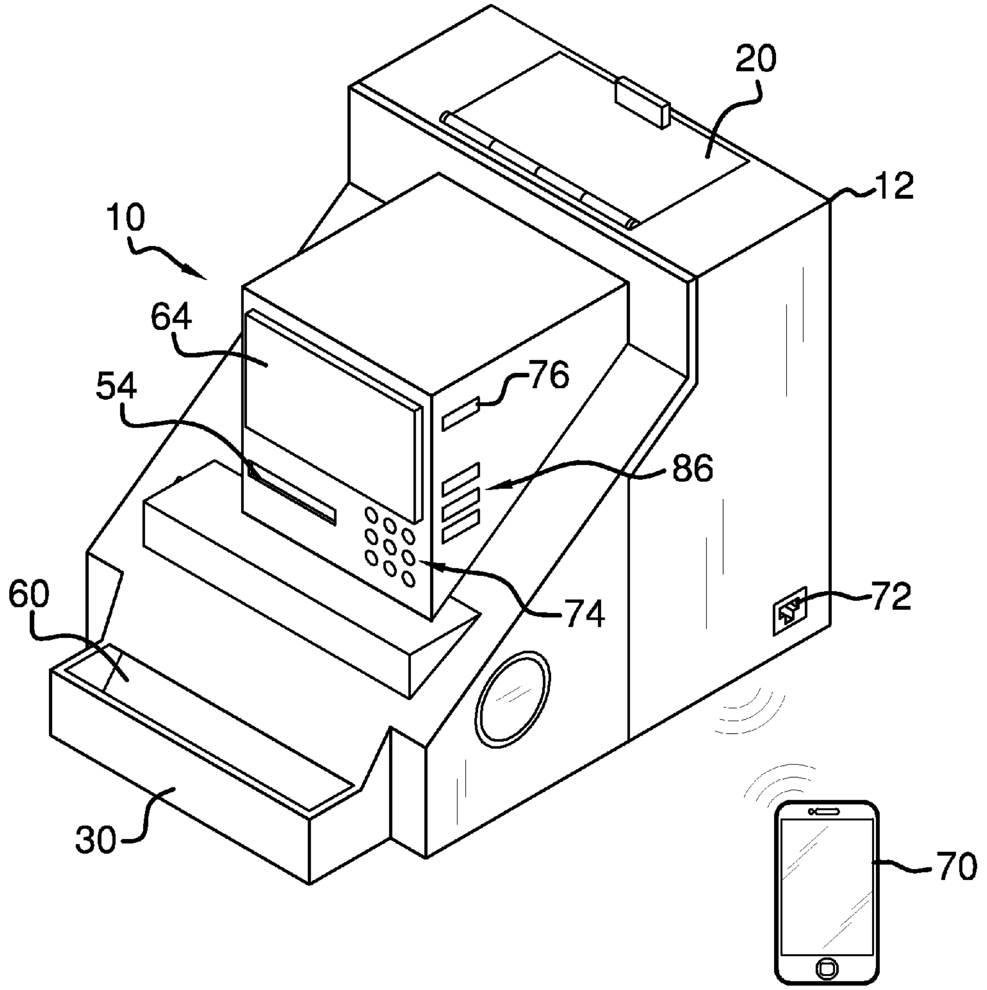
FIG. 1 is a top front side perspective view of a portable test tube labeling device according to an embodiment of the disclosure.
Figure 2:
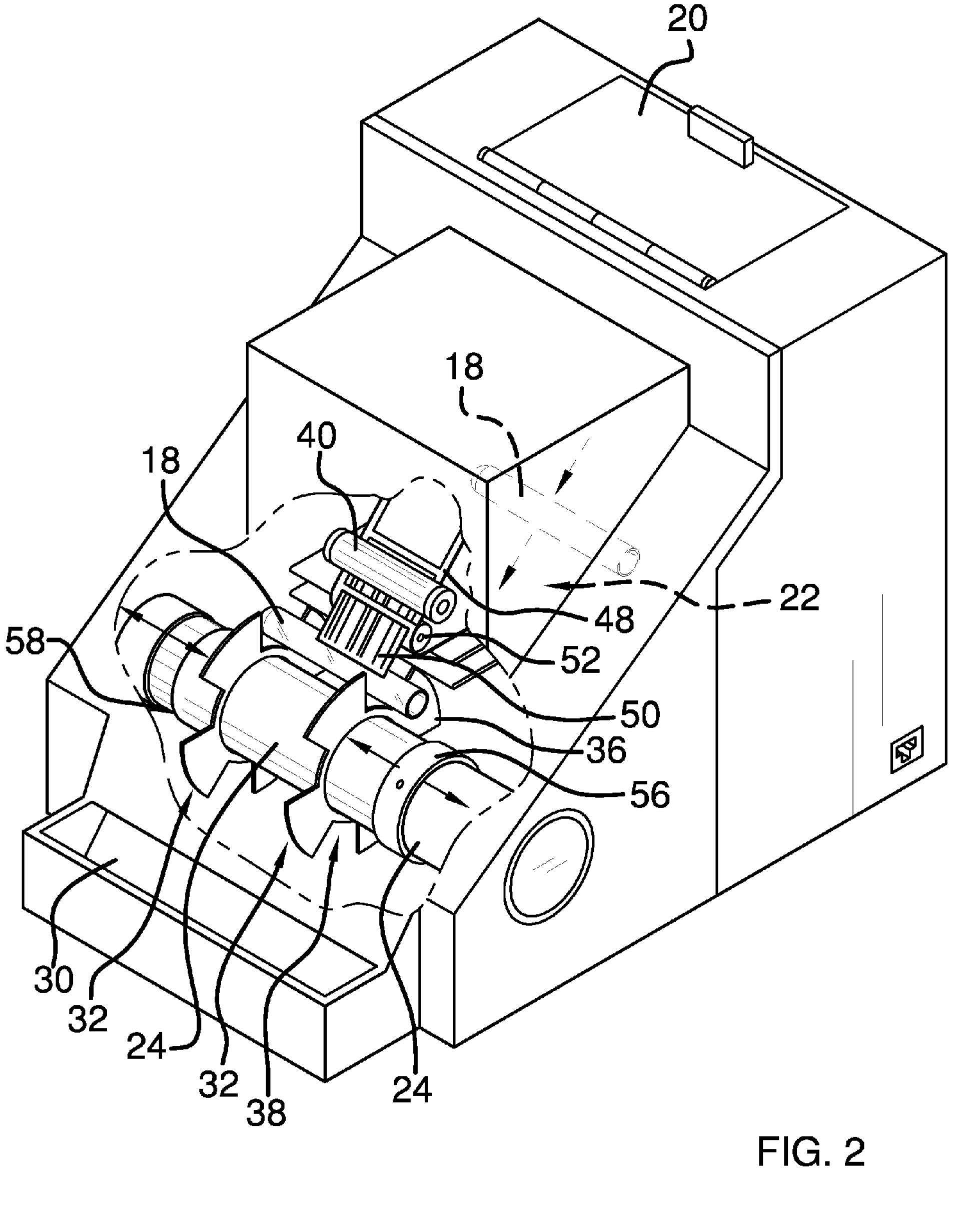
FIG. 2 is a partial cut-away top front side perspective view of an embodiment of the disclosure.
Figure 3:
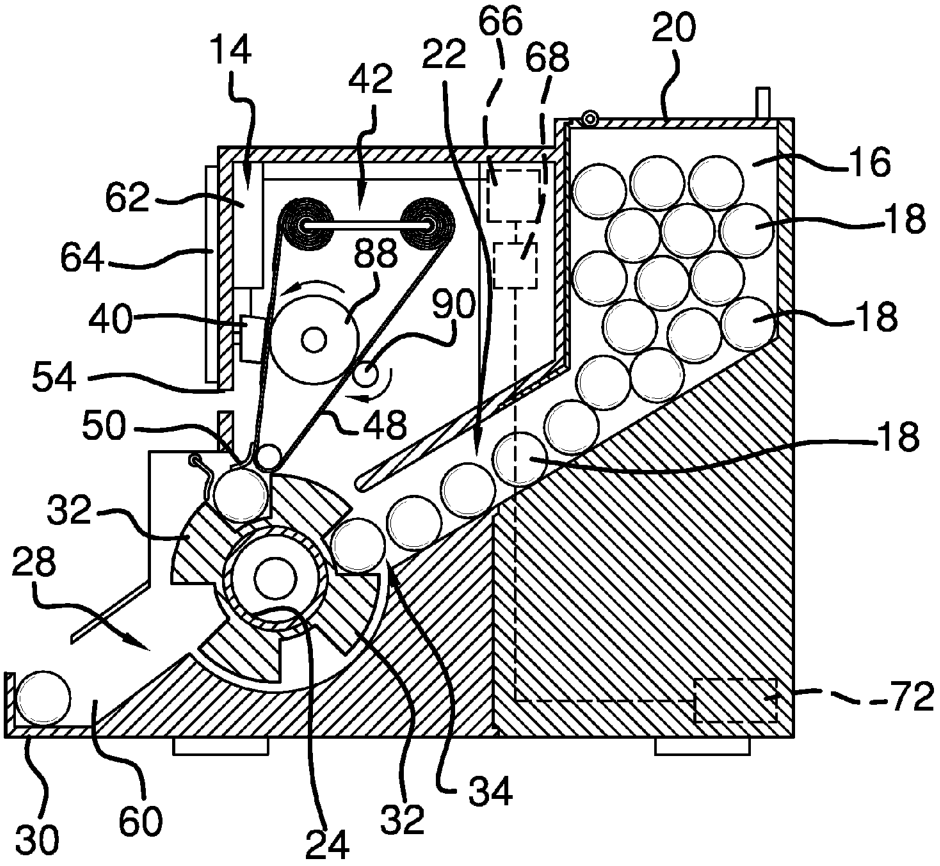
FIG. 3 is a cross-sectional view of an embodiment of the disclosure taken along line 3-3 of FIG. 1.
Figure 4:
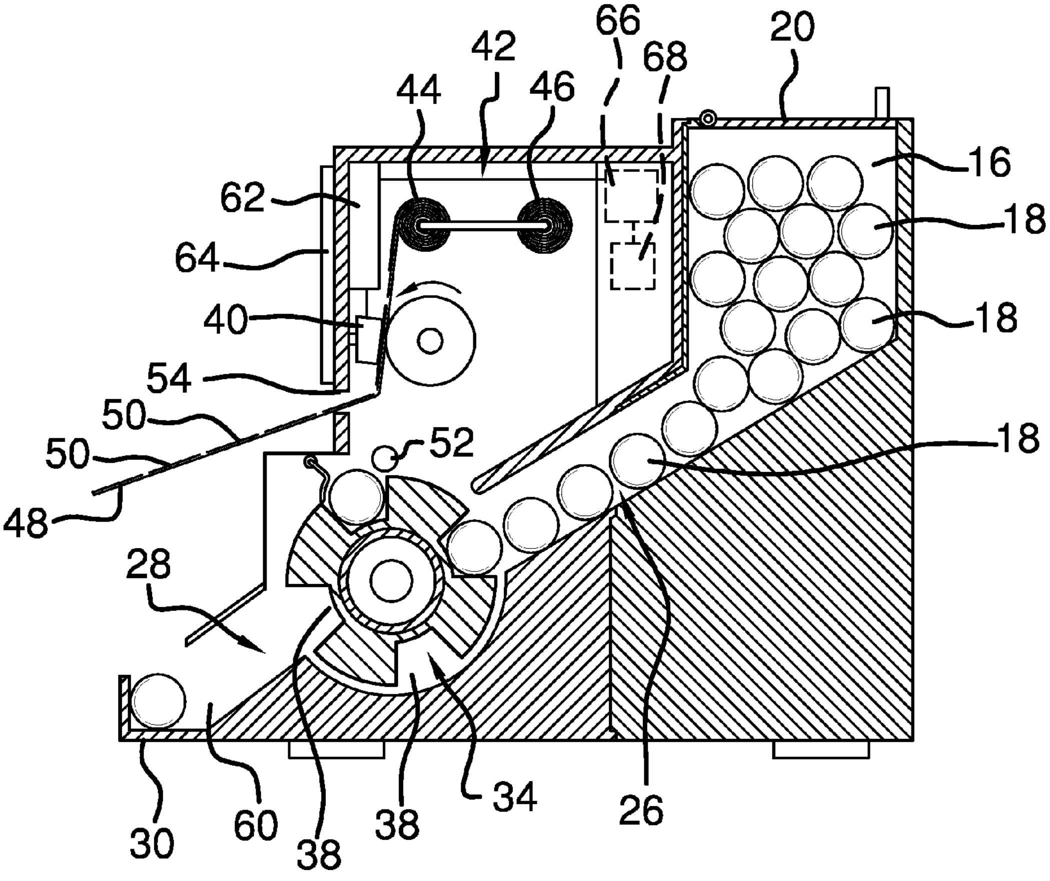
FIG. 4 is a cross-sectional view of an embodiment of the disclosure similar to FIG. 3 but showing labels dispensed for manual application.
Figure 5:
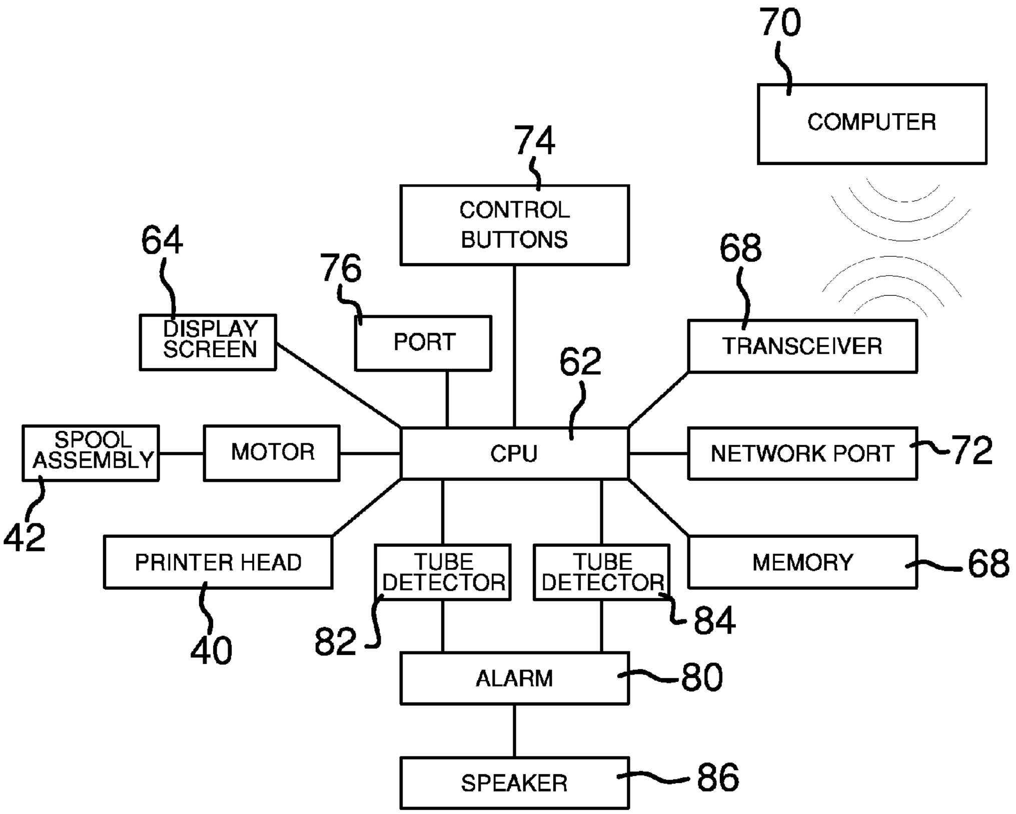
FIG. 5 is a schematic view of an embodiment of the disclosure.

With reference now to the drawings, and in particular to FIGS. 1 through 5 thereof, a new labeling device embodying the principles and concepts of an embodiment of the disclosure and generally designated by the reference numeral 10 will be described.

As best illustrated in FIGS. 1 through 5, the portable test tube labeling device 10 generally comprises a housing 12 defining an interior space 14. The interior space 14 includes a chamber 16 configured for holding a plurality of test tubes 18. A door 20 may be provided in the housing 12 to provide access to the chamber 16 for loading the test tubes 18 into the chamber 16. A chute 22 extends through the housing 12. A barrel 24 is positioned in the housing 12. The barrel 24 is rotatable within the housing 12. The barrel 24 is positioned to extend across the chute 22 dividing the chute 22 into a feed section 26 extending from the chamber 16 and a delivery section 28 extending from the barrel 24 downwardly towards a tray 30. The tray 30 is coupled to the housing 12 by attachment or integrally. The tray 30 is positioned at a distal end 60 of the delivery section 28 of the chute 22 relative to the barrel 24. The test tubes 18 may be labeled while capped, or without a cap thereon.

Spacers 32 are coupled to the barrel 24. The spacers 32 define a plurality of channels 34 extending longitudinally along the barrel 24. Each channel 34 is configured to receive one of the test tubes 18 as the barrel 24 is rotated and the channel 34 passes into the chute 22. Each of the spacers 32 is a disc 36 having a plurality of radial slots 38. The discs 36 are positioned in spaced relationship on the barrel 24. Each disc 36 is coupled to the barrel 24 such that the disc 36 is transverse to a longitudinal axis of the barrel 24. Each disc 36 has an arcuate outer edge for moving smoothly against an abutting one of the test tubes 18. Each channel 34 has a depth such that the channel 34 receives only one test tube 18 and rotation of the barrel 24 lifts and separates the one test tube 18 to control dispensing of each test tube 18 into the delivery section 28 of the chute 22.

A printing head 40 is positioned in the housing 12. A spool assembly 42 is positioned in the housing 12. The spool assembly 42 has a feed spool 44 and a collection spool 46. A tape 48 has a plurality of labels 50 thereon. The tape 48 is coupled to the spool assembly 42 such that the tape 48 passes adjacent to the printing head 40 wherein indicia is printable on the labels 50 on the tape 48 by the printing head 40. The spool assembly 42 includes a roller 52 positioned adjacent to the barrel 24 and each channel 34 as the channel 34 is rotated past the roller 52. The roller 52 provides sufficient curvature such that each label 50 becomes dislodged from the tape 48, is extended from the tape 48, and is delivered onto the test tube 18 in each channel 34. The labels 50 are spaced on the tape 48 to correspond to the spacing of the channels 34 on the barrel 24. The feed spool 44 holds the tape 48 being dispensed towards the barrel 24 and the collection spool 46 is positioned to receive the tape 48 after dispensing of the labels 50 from the tape 48. A main roller 88 is positioned in the housing 12 adjacent to the printing head 40 and an auxiliary roller 90. The tape 48 passes between the main roller 88 and the printing head 40 for printing on the labels 50. The tape 48 passes back between the main roller 88 and the auxiliary roller 90 as the tape 48 returns to the collection spool 46. The main roller 88 may be powered to rotate in a conventional manner to drive the tape 48. The main roller 88 may be powered directly or by rotation of the auxiliary roller 90 which may be biased towards the main roller 88 to maintain contact with the main roller 88. A slit 54 extends through the housing 12. The tape 48 is positionable to extend through the slit 54 wherein the tape 48 delivers each of the labels 50 out of the housing 12 for manual placement on one of the test tubes 18 or for placement on any other object if so desired.

The device 10 accommodates variously sized test tubes 18. A collar 56 is coupled to the barrel 24 in spaced relationship to a base end 58 of the barrel 24. Thus, the collar 56 is configured for retaining each of the test tubes 18 in one of the channels 34 between the collar 56 and the base end 58 of the barrel 24. A position of the collar 56 is adjustable along a length of the barrel 24 wherein the channels 34 are configured for accommodating variable lengths of test tubes 18. Additional structure such as a barrier, sliding wall, or the like may be utilized to assist in aligning the test tubes 18 as they move through the chute 22 towards the channels 34. The printing head 40 is positioned between the collar 56 and the base end 58 of the barrel 24.

A processor 62 is coupled to and positioned in the housing 12. A display screen 64 is coupled to the housing 12 and communicatively coupled to the processor 62. The display screen 64 is a touch screen and the processor 62 is operationally coupled to the printing head 40, the spool assembly 42 and the barrel 24 wherein creation and dispensing of indicia on the labels 50 is controllable through operation of the touch screen. Alternatively, control buttons 74 may be provided on the housing 12 and operationally coupled to the processor 62. A memory unit 66 is coupled to and positioned in the housing 12. The memory unit 66 is communicatively coupled to the processor 62 for storing a record of information printed onto the labels 50. The record may be displayed on the display screen 64 and may be protected by a password or the like for security. A transceiver 68 is also coupled to and positioned in the housing 12. The transceiver 68 is operationally and communicatively coupled to the processor 62 wherein the processor 62 is configured for communicating with an extrinsic apparatus 70 such as a computer, laptop, electronic tablet, or the like. The transceiver 68 may utilize wireless communications including internet or a personal access network. A network port 72 may also be coupled to the housing 12. The network port 72 is communicatively coupled to the processor 62 wherein the transceiver 68 is configured for communication with the extrinsic apparatus 70 through the network port 72. Additionally, a connection port 76 may be provided for transferring data directly to a jump drive or the like. In a conventional manner, an alarm 80 may be operationally coupled to the processor 62 and a label detector 82 and a tube detector 84 to indicate running out of either labels 50 or test tubes 18. A speaker 86 may be coupled to the housing 12 to provide an audio signal responsive to the alarm 80.

Gravity feeding of the test tubes 18 reduces overall weight and needed footprint of the device 10 to facilitate moving of the device 10 as needed. Further, the device 10 may be powered by battery. The battery may be rechargeable and solar cells incorporated for maintaining a charge in the battery.

In use, test tubes 18 of a desired size are loaded into the chamber 16 within the housing 12. The test tubes 18 are fed by gravity through the chute 22 to the channels 34. The touch screen or control buttons 74 are used to control operation of the device 10 to provide a desired label 50 automatically placed onto one of the test tubes 18 or manually placed onto one of the test tubes 18, a patient chart, record book, or the like. The collar 56 may be adjusted to properly align the test tubes 18 for delivery into the channels 34. Rotation of the barrel 24 in combination with operation of the spool assembly 42 and printing head 40 prints the desired label as directed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A test tube labeling device comprising:

a housing, an interior space of said housing comprising a chamber configured for holding a plurality of test tubes;

a chute extending through said housing;

a barrel positioned in said housing, said barrel being rotatable within said housing, said barrel being positioned to extend across said chute;

spacers coupled to said barrel, said spacers defining a plurality of channels extending along said barrel, each said channel being configured to receive one of the test tubes as said barrel is rotated;

a printing head positioned in said housing;

a spool assembly positioned in said housing;

a tape having a plurality of labels thereon, said tape being coupled to said spool assembly such that said tape passes adjacent to said printing head wherein indicia is printable on said labels on said tape by said printing head, said spool assembly being positioned adjacent to each said channel as said channel is rotated such that each said label is extended from said tape and delivered onto the test tube in each said channel; and a collar coupled to said barrel in spaced relationship to a base end of said barrel wherein said collar is configured for retaining each of the test tubes in one of said channels between said collar and said base end of said barrel.

2. The device of claim 1, further comprising a position of said collar being adjustable along a length of said barrel wherein said channels are configured for accommodating variable lengths of test tubes.

3. The device of claim 2, further comprising said printing head being positioned between said collar and said base end of said barrel.

4. The device of claim 1, further comprising said barrel dividing said chute into a feed section extending from said chamber and a delivery section extending from said barrel.

5. The device of claim 4, further comprising a tray being coupled to said housing, said tray being positioned at a distal end of said delivery section of said chute relative to said barrel.

6. The device of claim 1, further comprising each of said spacers being a disc having a plurality of radial slots, said discs being positioned in spaced relationship on said barrel.

7. The device of claim 6, further comprising each said disc being coupled to said barrel such that said disc is transverse to a longitudinal axis of said barrel.

8. The device of claim 6, further comprising each said disc having an arcuate outer edge.

9. The device of claim 1, further comprising:

a processor coupled to and positioned in said housing; and a display screen coupled to said housing, said display screen being communicatively coupled to said processor.

10. The device of claim 9, further comprising said display screen being a touch screen, said processor being operationally coupled to said printing head, said spool assembly and said barrel wherein creation and dispensing of indicia on said labels is controllable through operation of said touch screen.

11. The device of claim 9, further comprising a memory unit coupled to and positioned in said housing, said memory unit being communicatively coupled to said processor for storing a record of information printed onto said labels.

12. The device of claim 9, further comprising a transceiver coupled to and positioned in said housing, said transceiver being operationally and communicatively coupled to said processor wherein said processor is configured for communicating with an extrinsic apparatus.

13. The device of claim 12, further comprising said transceiver utilizing a personal access network.

14. The device of claim 12, further comprising a network port coupled to said housing, said network port being communicatively coupled to said processor wherein said transceiver is configured for communication with the extrinsic apparatus through said network port.

15. The device of claim 1, further comprising a slit extending through said housing, said tape being positionable to extend through said slit wherein said tape delivers each of said labels out of said housing for manual placement on one of the test tubes.

16. The device of claim 1, further comprising said spool assembly having a feed spool and a collection spool, said feed spool holding said tape being dispensed towards said barrel, said collection spool being positioned to receive said tape after dispensing of said labels from said tape.

17. A test tube labeling device comprising:

a housing, an interior space of said housing comprising a chamber configured for holding a plurality of test tubes;

a chute extending through said housing;

a barrel positioned in said housing, said barrel being rotatable within said housing, said barrel being positioned to extend across said chute, said barrel dividing said chute into a feed section extending from said chamber and a delivery section extending from said barrel;

spacers coupled to said barrel, said spacers defining a plurality of channels extending along said barrel, each said channel being configured to receive one of the test tubes as said barrel is rotated, each of said spacers being a disc having a plurality of radial slots, said discs being positioned in spaced relationship on said barrel, each said disc being coupled to said barrel such that said disc is transverse to a longitudinal axis of said barrel, each said disc having an arcuate outer edge;

a printing head positioned in said housing;

a spool assembly positioned in said housing, said spool assembly having a feed spool and a collection spool;

a tape having a plurality of labels thereon, said tape being coupled to said spool assembly such that said tape passes adjacent to said printing head wherein indicia is printable on said labels on said tape by said printing head, said spool assembly being positioned adjacent to each said channel as said channel is rotated such that each said label is extended from said tape and delivered onto the test tube in each said channel, said feed spool holding said tape being dispensed towards said barrel, said collection spool being positioned to receive said tape after dispensing of said labels from said tape;

a slit extending through said housing, said tape being positionable to extend through said slit wherein said tape delivers each of said labels out of said housing for manual placement on one of the test tubes;

a collar coupled to said barrel in spaced relationship to a base end of said barrel wherein said collar is configured for retaining each of the test tubes in one of said channels between said collar and said base end of said barrel, a position of said collar being adjustable along a length of said barrel wherein said channels are configured for accommodating variable lengths of test tubes, said printing head being positioned between said collar and said base end of said barrel;

a tray being coupled to said housing, said tray being positioned at a distal end of said delivery section of said chute relative to said barrel;

a processor coupled to and positioned in said housing;

a display screen coupled to said housing, said display screen being communicatively coupled to said processor, said display screen being a touch screen, said processor being operationally coupled to said printing head, said spool assembly and said barrel wherein creation and dispensing of indicia on said labels is controllable through operation of said touch screen;

a memory unit coupled to and positioned in said housing, said memory unit being communicatively coupled to said processor for storing a record of information printed onto said labels;

a transceiver coupled to and positioned in said housing, said transceiver being operationally and communicatively coupled to said processor wherein said processor is configured for communicating with an extrinsic apparatus, said transceiver utilizing a personal access network; and a network port coupled to said housing, said network port being communicatively coupled to said processor wherein said transceiver is configured for communication with the extrinsic apparatus through said network port.

* * * * *